United States Patent [19]
Soria Vega

[11] Patent Number: 5,595,206
[45] Date of Patent: Jan. 21, 1997

[54] BALL VALVE HAVING ONE-PIECE MACHINED SEAT MEMBER

[75] Inventor: Sergio Soria Vega, Huntington Beach, Calif.

[73] Assignee: Greene, Tweed of Delaware, Inc., Wilmington, Del.

[21] Appl. No.: 448,153

[22] Filed: May 23, 1995

[51] Int. Cl.$^6$ .................................................... F16K 5/04
[52] U.S. Cl. ............................. 137/15; 251/309; 264/429
[58] Field of Search ......................... 137/15; 251/315.05, 251/309; 264/322, 422, 429, 266

[56] References Cited

U.S. PATENT DOCUMENTS

| | | | |
|---|---|---|---|
| 3,223,111 | 12/1965 | Anderson | 251/315.05 X |
| 3,314,644 | 4/1967 | Dwyer et al. | 264/242 X |
| 3,974,869 | 8/1976 | Abe et al. | 251/315.05 X |
| 5,266,258 | 11/1993 | Martin | 264/249 |

Primary Examiner—John C. Fox
Attorney, Agent, or Firm—Panitch Schwarze Jacobs & Nadel, P.C.

[57] ABSTRACT

A ball valve having a one-piece seat member is disclosed. The one-piece seat member is cylindrically shaped to engage a valve chamber within the valve body, and includes an internal cavity for receiving a ball member, a first axial opening for receiving an operating stem engaged to the ball member, and first and second radial openings that align with inlet and outlet passages in the valve body. The one-piece seat member can be machined from such materials as polytetrafluoroethylene, ultra-high molecular weight polyethylene, fluorinated ethylene propylene, or perfluoroalkoxy. To make the ball valve, the one-piece seat member is formed with the internal cavity, the first axial opening, a second axial opening opposite the first axial opening, and the first and second radial openings, and is caused to be in a deformable state. The ball member is then inserted into the internal cavity such that the operating stem extends out of the first axial opening, and the seat member with the inserted ball member is adjusted to engage the valve chamber.

8 Claims, 2 Drawing Sheets

BALL VALVE HAVING ONE-PIECE MACHINED SEAT MEMBER

BACKGROUND OF THE INVENTION

The present invention relates generally to ball valves, and more particularly, to a ball valve having a one-piece machined seat member such that the incidence of leakage is reduced and the ball valve is highly reliable.

Typically, in a ball valve, a seat member is positioned within a valve chamber to seal and selectively isolate two or more ports leading to the valve chamber. The seat member substantially surrounds a metal or plastic ball member, and an operating stem extends from the ball member. The valve is operated by rotating the stem to selectively align two or more of the ports with corresponding passages in the ball member.

It is known to form the seat member around the ball member by positioning the ball member between upper and lower seat member pieces and then welding, fusing, or otherwise joining the upper and lower seat member pieces to each other. However, a recurring problem with a ball valve having such a two-piece seat member is that leakage occurs at the juncture of the pieces.

It also is known to employ injection molding techniques to form a one-piece seat member around the ball member. However, the injection molding results in a joining line on the external surface of the seat member, and the joining line is susceptible to damage from pressure, temperature, use, and chemicals sealed by the valve, among other things. When damaged, the joining line breaks down and allows leakage in the ball valve.

A need exists, then, for a ball valve with a seat member that reduces the likelihood of leakage at the joining line. More particularly, a need exists for a ball valve with a one-piece seat member that does not have a joining line.

SUMMARY OF THE INVENTION

The aforementioned need is satisfied by a ball valve having a valve body and a one-piece seat member enclosing and sealing a ball member and at least a portion of an operating stem. The seat member is generally cylindrically shaped and sized for sealingly engaging a valve chamber within the valve body, and includes an internal cavity, a first axial opening, and first and second radial openings. The internal cavity is sized and shaped for receiving and sealingly engaging the ball member. The first axial opening communicates with the internal cavity and sealingly engages the operating stem. The first and second radial openings communicate with the internal cavity and align with inlet and outlet passages in the valve body. The one-piece seat member is machined from such materials as polytetrafluoroethylene, fluorinated ethylene propylene, ultra-high molecular weight polyethylene, or perfluoroalkoxy.

To make the ball valve, the valve body and the operating stem engaged with the ball member are provided, and the one-piece seat member is formed with the internal cavity, the axial opening, and the first and second radial openings.

The seat member is then caused to be in a deformable state where the seat member deforms but does not break under pressure, and the ball member is inserted into the internal cavity of the deformable seat member such that the operating stem extends out of the first axial opening. Thereafter, the size and shape of the seat member with the inserted ball member is adjusted such that the seat member is sized and shaped for sealingly engaging the valve chamber. The seat member is then positioned in the valve chamber.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF PREFERRED EMBODIMENTS

Figure 1:
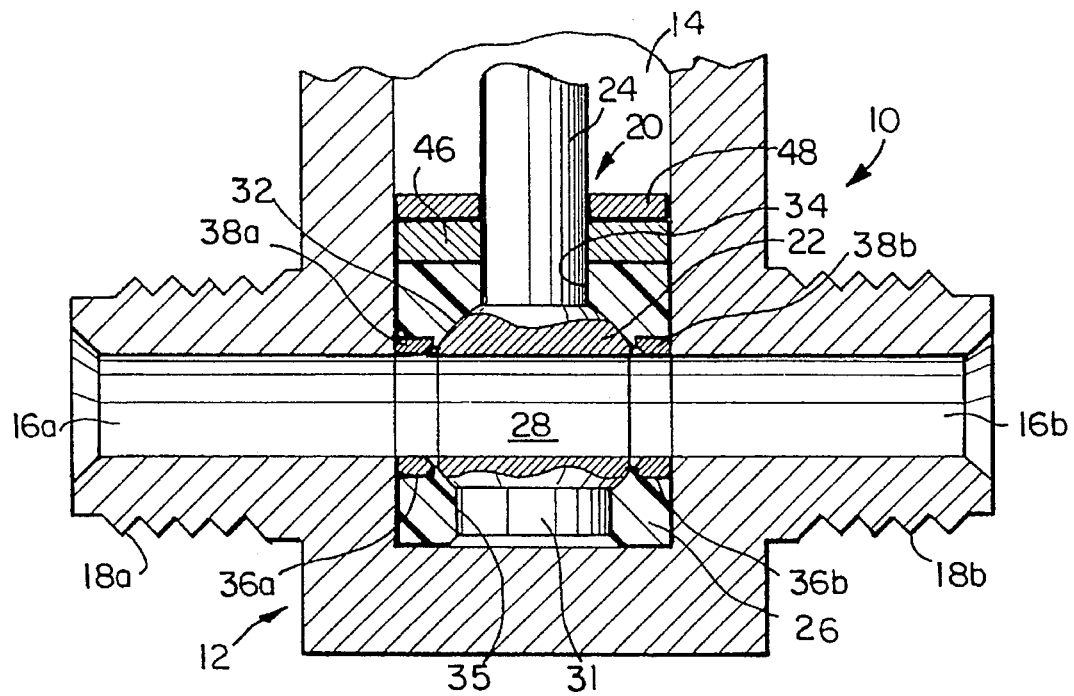
FIG. 1 is a cross-sectional view of a ball valve constructed in accordance with a first embodiment of the present invention and shows a rotatable member positioned within a valve body member.

Certain terminology may be used in the following description for convenience only and is not limiting. The words "left", "right", "upper" and "lower" designate directions in the drawings to which reference is made. The words "inwardly" and "outwardly" are further directions toward and away from, respectively, the geometric center of the referenced element. The terminology includes the words above specifically mentioned, derivatives thereof, and words of similar import.

Referring to the drawings in detail, wherein like numerals are used to indicate like elements throughout, there is shown in FIG. 1 a ball valve 10 constructed in accordance with a preferred embodiment of the present invention. The ball valve 10 includes a valve body 12 with a valve chamber 14 defined by a generally cylindrical bore. Inlet and outlet passages 16a, 16b are formed in the valve body 12 to be in communication with the valve chamber 14 and, as seen, may be generally radially oriented with respect to the cylindrical bore. Threadings 18a, 18b are provided on the valve body 12 around the inlet and outlet passages 16a, 16b to allow for the attachment of conduits (not shown) to the ball valve 10.

Preferably, the valve body 12 is formed from a metal or stainless steel material, although one skilled in the art will recognize that, depending upon the application, other materials such as thermoplastics may be employed without departing from the spirit and scope of the present invention. Moreover, one skilled in the art will also recognize that although the valve body 12 is shown in FIG. 1 with two passages 16a, 16b, additional passages may be provided without departing from the spirit and scope of the present invention.

As seen in FIG. 1, a rotatable member 20 is positioned within the valve chamber 14 of the ball valve 10. The rotatable member 20, also seen in FIG. 2, has a ball member 22, an operating stem 24, and a machined seat member 26.

The ball member 22 is constructed from a metal or plastic material or another suitable material and has a passage 28 extending completely therethrough. As seen in FIG. 1, the passage 28 is generally radially oriented with respect to the valve chamber 14 such that the passage 28 may be rotated into and out of alignment with the inlet and outlet passages 16a, 16b. As should be understood, when aligned, the ball valve 10 is "open" and a fluid may flow from the inlet passage 16a through passage 28 and out of the outlet passage 16b. Correspondingly, when not aligned, the ball valve 10 is "closed" and the fluid is prevented from flowing through the ball valve 10.

Figure 2:
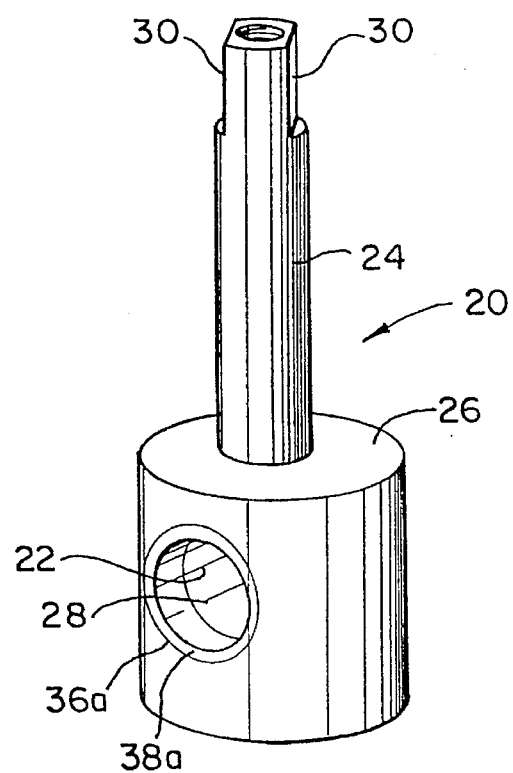
FIG. 2 is a perspective view of the rotatable member of the ball valve shown in FIG. 1.

The operating stem 24 engages the ball member 22 and extends out of the valve chamber 14 in a generally coaxial manner with respect thereto. As seen in FIG. 2, the distal end of the operating stem 24 may have one or more lands 30 to provide positive engagement with a connecting member (not shown). Accordingly, the ball member 22 may be rotated by the operating stem 24 between a first position in which the ball valve 10 is open (shown in FIG. 1) and a second position in which the ball valve 10 is closed (not shown).

Preferably, the operating stem 24 is constructed from the same material as the ball member 22. More preferably, the ball member 22 and the operating stem 24 are machined as a single unitary body. However, one skilled in the art will recognize that other materials and other attaching mechanisms may be employed without departing from the spirit and scope of the present invention.

The ball member 22 may have a coaxial base member 31 engaged therewith opposite the operating stem 24. The base member 31 remains after the machining of the ball member 22 and the operating stem 24 as part of the single unitary body, and may be useful in seating the rotatable member 20 within the valve chamber 14.

The seat member 26 encloses the ball member 22, at least a portion of the operating stem 24, and at least a portion of the base member 31. As best seen in FIG. 2, the seat member 26 is generally cylindrically shaped such that when the rotatable member 20 is positioned within the valve chamber 14 (FIG. 1), the seat member 26 tightly sealingly engages the valve chamber 14. As should be understood, the seat member 26 must also tightly sealingly engage the operating stem 24, the base member 31, and the ball member 22, as well as the juncture of the outer surface of the ball member 22 and the passage 28. Additionally, the seat member 26 must tightly sealingly engage the cylindrical bore defining the valve chamber 14 while at rest and while in transition between the open and closed positions.

As seen in FIGS. 1 and 2, the seat member 26 has first and second generally axial openings 34, 35 and first and second generally radial openings 36a, 36b, each communicating with an internal cavity 32. As should be understood, when the rotatable member 20 is assembled, the ball member 22 is positioned within the internal cavity 32, the operating stem 24 is positioned within the first axial opening 34, and the base member 31 is positioned within the second axial opening 35. Moreover, when the rotatable member is positioned within the valve chamber 14 of the ball valve 10, the first and second radial openings 36a, 36b are respectively rotatably alignable with the inlet and outlet passages 16a, 16b.

Preferably, the seat member 26 is machined from a single piece of a polymeric material such as polytetrafluoroethylene, fluorinated ethylene propylene, ultra-high molecular weight polyethylene, perfluoroalkoxy, or other similar materials. As should be understood, such materials are easily machined and can withstand wide ranges of pressure and temperature while still maintaining a good quality seal. Since the seat member 26 is a one-piece machined member and is not injection molded, no joining line is present and the incidence of leakage in the ball valve 10 is substantially reduced. As should also be understood, other similar polymeric materials such as acetal and the like may be employed without departing from the spirit and scope of the present invention so long as such other materials are also easily machined and can also withstand wide ranges of pressure and temperature while still maintaining a good quality seal.

As seen in FIG. 1, the radial openings 36a, 36b in the seat member 26 may be defined by inserted metal rings 38a, 38b. As should be understood, the metal rings 38a, 38b prevent the seat member 26 and the first and second radial openings 36a, 36b from collapsing under high fluid pressure.

Figure 3A:
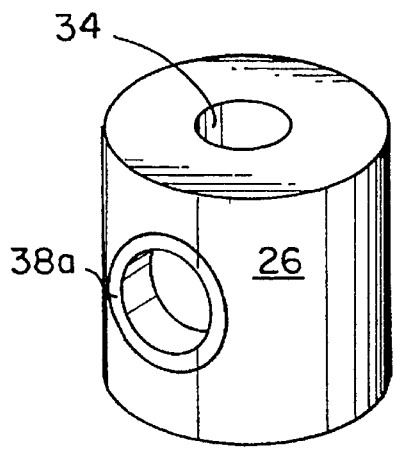
FIGS. 3A–3D show various steps performed during fabrication of the rotatable member shown in FIG. 2.

To make the ball valve 10, the following method is preferably employed. Preliminarily, the valve body 12 as described above is provided and the seat member 26 (as seen in FIG. 3A) is formed with the internal cavity 32, the first and second axial openings 34, 35, and the first and second radial openings 36a, 36b. In particular, the internal cavity 32, the first axial opening 34, and the second axial opening 35 are sized and shaped to correspond to the size and shape of the to-be-received ball member 22, operating stem 24, and base member 31, respectively. The seat member 26 is preferably machined from a block of a polymeric material, and is more preferably machined from a portion of a cylindrical rod of the polymeric material that is in a rigid and non-deformable state at room temperature. Accordingly, the seat member 26 does not have any weld or joining lines that can contribute to ball valve leakage.

The ball member 22 is preferably inserted into the internal cavity 32 through the second axial opening 35. However, it will be recognized that the ball member 22 may be inserted into the seat member 26 through the first axial opening 34, if feasible. In such a case, the second axial opening 35 may be unnecessary if the base member 31 is not present.

Whether the ball member 22 is inserted into the internal cavity 32 through the first axial opening 34 or the second axial opening 35, such insertion cannot be performed when the machined seat member 26 is in the rigid, non-deformable state, since the first axial opening 34 and the second axial opening 35 each have a diameter which is smaller than the diameter of the ball member 22, as seen in FIG. 1. Accordingly, the seat member 26 must be caused to be in a deformable state such that the seat member 26 deforms but does not break under pressure.

Figure 3B:
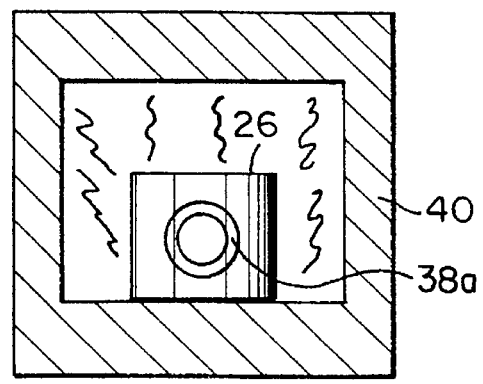

Preferably, the polymeric seat member 26 is caused to be in such a deformable state when heated to a predetermined temperature. As seen in FIG. 3B, the seat member 26 may be heated in an oven 40. However, one skilled in the art will recognize that the deformable state of the seat member 26 may be achieved by other means such as by being dipped in hot liquid, for example, without departing from the spirit and scope of the present invention.

Figure 3C:
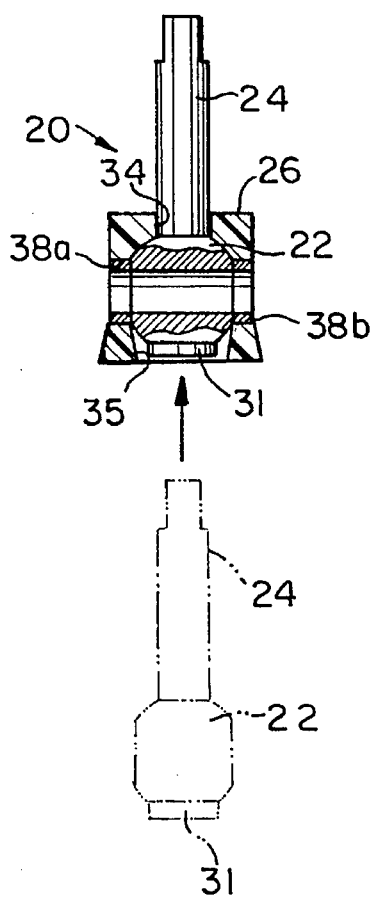

Once the seat member 26 is in the deformable state, the ball member 22 with the engaged operating stem 24 is inserted into the internal cavity 32 by the application of sufficient force to pressure the ball member 22 through the first axial opening 34 (not shown) or the second axial opening 35 (as seen in FIG. 3C). To assist in the insertion of the ball member 22 and operating stem 24 into the seat member 26, the seat member 26 may be positioned in a holder (not shown) while the force is being applied. When inserted, the operating stem 24 extends from the seat member 26 out of the first axial opening 34.

Figure 3D:
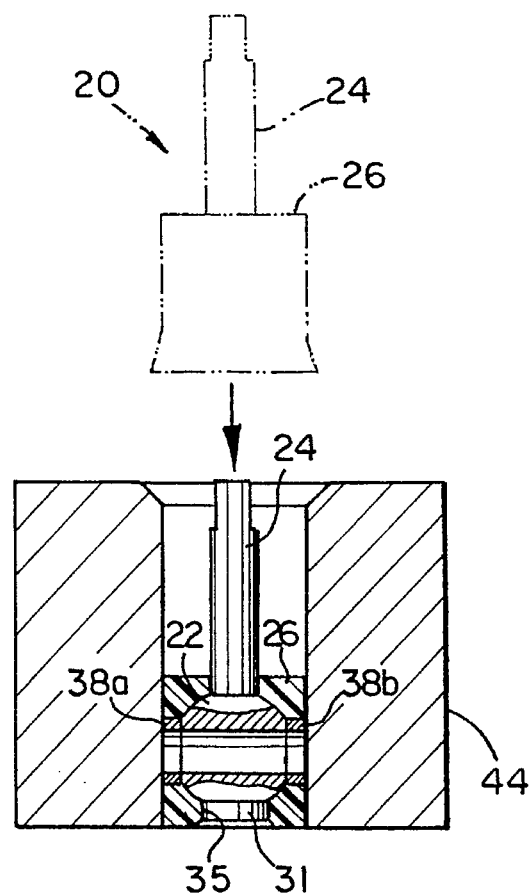

The insertion of the ball member 22 may result in the deformation of at least a portion of the seat member 26, as shown in FIGS. 3C and 3D. The deformation may be on the order of 20–30 percent. As is evident, the deformed seat member 26 will not perform the sealing function set forth above and will not be received by the valve chamber 14. Accordingly, the size and shape of the seat member 26 must be adjusted such that the seat member 26 sealingly engages the ball member 22, base member 31, and operating stem 24 positioned therein and such that the seat member 26 is sized and shaped for sealingly engaging the valve chamber 14 when installed therein.

Preferably, such adjusting is performed by forcing the still-deformable seat member 26 with the inserted ball member 22 and operating stem 24 into a sleeve 44 having a predefined shape and size. Preferably, the shape and cylindrical diameter of the sleeve 44 correspond to the outer shape and cylindrical diameter of the formed polymeric seat member 26 as seen in FIG. 3A, and to the shape and cylindrical diameter of the valve chamber 14 shown in FIG. 1.

The seat member 26 with the inserted ball member 22 and operating stem 24 may be re-heated prior to being forced into the sleeve 44, if necessary. Once forced into the sleeve 44, the seat member 26 may then be cooled or quenched by water, air, or other similar means such that the polymeric seat member 26 is no longer in the deformable state. In addition or as an alternative, the deformed polymeric seat member 26 may be adjusted by further machining of the polymeric material forming the seat member 26.

Once the size and shape of the seat member 26 is properly adjusted, the seat member 26 is installed into the valve chamber 14. Preferably, the cylindrical diameter of the rotatable member 20 is slightly greater than the cylindrical diameter of the valve chamber 14. Accordingly, the rotatable member 20 maintains an interference fit with the valve body 12 to provide a sealing force between the valve body 12 and the rotatable member 20, and between the seat member 26 and the ball member 22 and operating stem 24.

As shown in FIG. 1, a washer 46 may be coaxially positioned around the operating stem 24 adjacent the seat member 26 and a spring 48 may be coaxially positioned adjacent the washer 46 to bias the rotatable member 20 into the valve chamber 14. Preferably, the spring 48 is a Belville-type spring, although one skilled in the art will recognize that other types of springs may be employed without departing from the spirit and scope of the present invention. As described and constructed, the ball valve 10 may be used in a variety of applications including temperatures from −350 degrees Fahrenheit to +600 degrees Fahrenheit and pressures up to 6,000 psi, and in a variety of chemical environments.

From the foregoing description, it can be seen that the present invention comprises an improved ball valve having a one-piece machined seat. It will be recognized by those skilled in the art that changes may be made to the above-described embodiment without departing from the broad inventive concepts thereof. It is understood, therefore, that this invention is not limited to the particular embodiments disclosed, but is intended to cover all modifications which are within the spirit and scope of the appended claims.

I claim:

1. A method of fabricating a ball valve comprising the steps of:

providing a valve body with a generally cylindrical bore extending therein to define a valve chamber and inlet and outlet passages communicating with the valve chamber;

forming a generally cylindrical one-piece polymeric seat member including an internal cavity for receiving and sealingly engaging a ball member, a first axial opening communicating with the internal cavity for sealingly engaging an operating stem secured to said ball member, a first generally radial opening communicating with the internal cavity and a second generally radial opening communicating with the internal cavity;

causing the polymeric seat member to change from a substantially non-deformable state to a substantially deformable state where the seat member deforms but does not break under pressure;

inserting a ball member having an operating stem engaged therewith into the internal cavity of the deformable seat member such that the operating stem extends out of the first axial opening, the insertion of the ball member deforming the polymeric seat member;

adjusting the size and shape of the deformed seat member with the inserted ball member such that the seat member is sized and shaped for sealingly engaging the valve chamber when installed therein; and installing the seat member into the valve chamber with the first seat member opening aligned with an inlet passage of the valve chamber, the second seat member opening aligned with an outlet passage of the valve chamber, and the operating stem extending out of the valve chamber.

2. The method of claim 1 wherein the forming step includes the step of machining the seat member from a block of a polymeric material.

3. The method of claim 1 wherein the forming step includes the step of machining the seat member from a portion of a rod of a polymeric material.

4. The method of claim 1 wherein the first causing step comprises heating the seat member to a predetermined temperature.

5. The method of claim 1 wherein the seat member further includes a second generally axial opening positioned generally opposite the first axial opening and communicating with the internal cavity, and wherein the inserting step comprises the step of forcing the ball member through the second axial opening of the deformable seat member and into the internal cavity such that the operating stem extends out of the first axial opening.

6. The method of claim 1 wherein the adjusting step includes the step of machining the deformed polymeric seat member such that the seat member is sized and shaped for sealingly engaging the valve chamber when installed therein.

7. The method of claim 1 wherein the formed polymeric seat member has a predefined outer shape and cylindrical diameter, and wherein the adjusting step includes the step of forcing the deformed polymeric seat member into a sleeve having a shape and cylindrical diameter generally corresponding to the outer shape and cylindrical diameter of the formed polymeric seat member.

8. A one-piece seat for a ball valve made in accordance with the method of claim 1.

* * * * *